(12) United States Patent
Koishi (10) Patent No.: US 6,683,755 B2
(45) Date of Patent: Jan. 27, 2004

(54) NEGATIVE PRESSURE TYPE HEAD SLIDER AND DISK DRIVE EMPLOYING SAME

(75) Inventor: Ryosuke Koishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 09/973,295

(22) Filed: Oct. 9, 2001

(65) Prior Publication Data

US 2003/0002218 A1 Jan. 2, 2003

(30) Foreign Application Priority Data

Jun. 14, 2001 (JP) ........................................ 2001-180573

(51) Int. Cl.⁷ .......................... G11B 5/60; G11B 15/64; G11B 17/32; G11B 21/20
(52) U.S. Cl. ............................. 360/235.6; 360/235.8; 360/236; 360/236.1; 360/236.3
(58) Field of Search ......................... 360/235.6, 235.8, 360/236, 236.1, 236.3, 235.5, 235.4, 234.3, 234, 230, 254.7

(56) References Cited

U.S. PATENT DOCUMENTS

| | | | | |
|---|---|---|---|---|
| 5,267,109 A | * | 11/1993 | Chapin et al. | 360/236.5 |
| 6,311,388 B1 | * | 11/2001 | Berg et al. | 29/603.12 |
| 6,333,835 B1 | * | 12/2001 | Kang et al. | 360/235.4 |
| 6,411,468 B1 | * | 6/2002 | Park et al. | 360/236.3 |
| 6,462,909 B1 | * | 10/2002 | Boutaghou et al. | 360/235.8 |
| 2001/0053046 A1 | * | 12/2001 | Koishi | 360/236.2 |
| 2002/0001157 A1 | * | 1/2002 | Kang et al. | 360/236.3 |
| 2002/0089790 A1 | * | 7/2002 | Stoebe et al. | 360/236.3 |

FOREIGN PATENT DOCUMENTS

JP         2000-173217         6/2000

* cited by examiner

Primary Examiner—Hoa T. Nguyen
Assistant Examiner—Julie Anne Watko
(74) Attorney, Agent, or Firm—Greer, Burns & Crain, Ltd.

(57) ABSTRACT

A head slider having a disk opposing surface, an air inlet end, and an air outlet end. The head slider includes a front rail formed on the disk opposing surface in the vicinity of the air inlet end, the front rail having an air bearing surface and a step surface lower in level than the air bearing surface; a transducer formed in the vicinity of the air outlet end; and a first groove for expanding air once compressed by the front rail to generate a negative pressure. The head slider further includes a second groove formed on the step surface near the air inlet end except opposite side portions of the step surface. The step surface reaches the air inlet end at the opposite side portions.

2 Claims, 9 Drawing Sheets

FIG.1
PRIOR ART

PRIOR ART

FIG.2A

PRIOR ART

NEGATIVE PRESSURE TYPE HEAD SLIDER AND DISK DRIVE EMPLOYING SAME

BACKGROUND OF THE INVENTION

1. Field of the Invention

The present invention relates generally to a negative pressure type magnetic head slider, and more particularly to a negative pressure type magnetic head slider for a load/unload type magnetic disk drive.

2. Description of the Related Art

In a recent magnetic disk drive, the flying height of a head slider from the surface of a magnetic disk is reduced more and more to increase a recording density. Further, a large acceleration is applied in an access direction to obtain a high access speed. It is accordingly desired to provide a head slider excellent in flying stability. Further, in association with size reduction of the disk drive and simplification of a mechanism in the disk drive, a rotary positioner is widely used. It is accordingly desired to provide a head slider in which variations in the flying height due to changes in yaw angle are suppressed.

To reduce the flying height of the head slider, the surface roughness of the surface of the magnetic disk must be reduced. In a contact start and stop (CSS) type magnetic disk drive heretofore widely used, a flying surface of a magnetic head slider comes into contact with a magnetic disk upon stoppage of rotation of the magnetic disk, and flies above the surface of the magnetic disk during rotation of the magnetic disk by the action of an air flow produced in concert with the rotation of the magnetic disk.

However, if the surface roughness of the magnetic disk in the CSS type magnetic disk drive is reduced, the contact area between the flying surface (air bearing surface) of the magnetic head slider and the surface of the magnetic disk upon stoppage of rotation of the magnetic disk becomes large. Accordingly, there is a possibility of stiction between the magnetic head slider and the magnetic disk at starting rotation of the magnetic disk. As measures against this stiction problem, it has been proposed to apply texture forming by laser to a CSS zone of the magnetic disk or provide a plurality of pads (projections) on the flying surface of the head slider in the CSS type magnetic disk drive.

A portable personal computer such as a notebook personal computer is often carried, and it is therefore required to have high shock resistance. Accordingly, such a personal computer generally employs a load/unload type magnetic disk drive designed so that a head slider is unloaded from the surface of a magnetic disk when the computer is powered off or put into a sleep mode and that the head slider is loaded to the surface of the magnetic disk when the computer is operated. That is, when the computer is powered off or put into a sleep mode, a horn portion formed at the front end of a suspension is seated on a ramp (inclined portion) of a ramp member provided near the outer circumference of the magnetic disk to retract the head slider flying a microscopic height above the disk surface from the magnetic disk. Accordingly, even when the computer receives shock, it is possible to avoid the possibility that the head slider may collide with the magnetic disk to damage the magnetic disk.

Such a magnetic disk drive having a load/unload mechanism is required to have a highly reliable magnetic head slider that is prevented from coming into contact or collision with a magnetic disk not only while the head slider is flying above the disk, but also when the head slider is loaded to the disk. A negative pressure type magnetic head slider is widely used in recent magnetic disk drives, so as to reduce the flying height of the magnetic head slider from the magnetic disk. As a negative pressure type magnetic head slider excellent in flying stability, there has been proposed a head slider in which a yaw angle dependence of flying height is reduced by increasing the widths of two rails from an air inlet end toward an air outlet end.

Further, variations in the flying height due to changes in yaw angle can be suppressed by reducing the width of a rail near the air inlet end. In these head sliders, a negative pressure (attraction force) is generated by changing only the width of each rail, thereby allowing simplification of a manufacturing process. Further, Japanese Patent Laid-open No. 2000-173217 includes a negative pressure type head slider which can further reduce the flying height, suppress variations in the flying height, and increase the rigidity.

In a recent magnetic disk drive, there is a tendency to reduce a magnetic disk spacing, in order to increase a storage capacity. To this end, the surface roughness of each magnetic disk is reduced, so that in the CSS type the stiction by the contact of the magnetic disk and the magnetic head slider in the rest condition becomes remarkable. To avoid this stiction problem, a load/unload type magnetic disk drive tends to be used not only in a portable personal computer such as a notebook personal computer, but also in a desktop personal computer.

A conventional negative pressure type magnetic head slider is mounted on a suspension so that the flying surface of the head slider becomes parallel to the magnetic disk at the instant when the head slider is loaded from the ramp member to the magnetic disk. Accordingly, there is a possibility that the head slider may come into contact with the disk because of a negative pressure generated on the head slider at the instant of loading.

Particularly in the case that a groove for generating a negative pressure is formed on the flying surface of the head slider so as to extend from a position upstream of the longitudinal center of the head slider to an air outlet end of the head slider, the head slider is inclined so that an air inlet end of the head slider is drawn to the magnetic disk by the negative pressure at the instant of loading, causing the contact of the air inlet end with the magnetic disk. To prevent this problem, there has been proposed a magnetic head slider mounted on a gimbal bent from a suspension so that the disk opposing surface of the head slider is inclined with respect to the disk surface at a given pitch angle in such a direction of raising the air inlet end from the disk surface. This pitch angle is set in the range of 1°±1°, for example.

In the case that the angle of incidence of the magnetic head slider mounted on the gimbal falls outside the above range, a negative pressure is generated on the magnetic head slider upon loading and the air inlet end of the head slider is rapidly lowered to cause a possibility of the contact of the air inlet end and the disk. To avoid this problem, there has been proposed a head slider in which a step surface formed on the disk opposing surface at a portion near the air inlet end is cut to form a groove for generating a positive pressure near the air inlet end in the case of loading the head slider at a negative pitch angle.

However, when the step surface is cut, the flying attitude of the head slider largely changes. Particularly, a peripheral speed dependence of pitch angle becomes large. This is due to the fact that the pressure at the air inlet end becomes unsaturated at low peripheral speeds because of cutting of the step surface. Accordingly, a reduction in negative pressure and rigidity occurs. Further, there occurs a reduction in performance such that a flying loss (a difference in level between a lowest flying point of the slider and a flying point of the head element) becomes large because of an increase in pitch angle depending on a peripheral speed.

SUMMARY OF THE INVENTION

It is therefore an object of the present invention to provide a negative pressure type magnetic head slider which can avoid the collision with a magnetic disk upon loading and can suppress the peripheral speed dependence of pitch angle.

In accordance with an aspect of the present invention, there is provided a head slider having a disk opposing surface, an air inlet end, and an air outlet end, the head slider comprising a front rail formed on the disk opposing surface in the vicinity of the air inlet end, the front rail having a first air bearing surface and a first step surface lower in level than the first air bearing surface; a transducer formed in the vicinity of the air outlet end; a first groove for expanding air once compressed by the front rail to generate a negative pressure; and a second groove formed on the first step surface near the air inlet end except opposite side portions of the first step surface; the first step surface reaching the air inlet end at the opposite side portions.

Preferably, each of the opposite side portions of the first step surface has a width less than or equal to 200 μm. More preferably, the width of each side portion is in the range of 50 to 150 μm. Preferably, the head slider further comprises a rear center rail formed on the disk opposing surface in the vicinity of the air outlet end at a substantially central position in the lateral direction of the head slider, the rear center rail having a second air bearing surface and a second step surface lower in level than the second air bearing surface; the transducer being formed on the second air bearing surface of the rear center rail near the air outlet end.

In accordance with another aspect of the present invention, there is provided a head slider having a disk opposing surface, an air inlet end, and an air outlet end, the head slider comprising a front rail formed on the disk opposing surface in the vicinity of the air inlet end, the front rail having a first air bearing surface and a first step surface lower in level than the first air bearing surface; a transducer formed in the vicinity of the air outlet end; a first groove for expanding air once compressed by the front rail to generate a negative pressure; and a pair of second grooves formed on the first step surface near the air inlet end except a laterally central portion of the first step surface; the first step surface reaching the air inlet end at the laterally central portion.

Preferably, the first step surface reaches the air inlet end also at opposite side portions of the first step surface. In this case, the laterally central portion has a width less than or equal to 700 μm, and each of the opposite side portions has a width less than or equal to 200 μm. More preferably, the width of the laterally central portion is in the range of 500 to 700 μm, and the width of each side portion is in the range of 50 to 150 μm.

Preferably, the head slider further comprises a rear center rail formed on the disk opposing surface in the vicinity of the air outlet end at a substantially central position in the lateral direction of the head slider, the rear center rail having a second air bearing surface and a second step surface lower in level than the second air bearing surface; the transducer being formed on the second air bearing surface of the rear center rail near the air outlet end.

In accordance with a further aspect of the present invention, there is provided a disk drive comprising a housing having a base; a negative pressure type head slider having a transducer for reading/writing data from/to a disk having a plurality of tracks, an air inlet end, and an air outlet end, and a disk opposing surface; an actuator for moving the negative pressure type head slider across the tracks of the disk; means for controlling the actuator to load/unload the negative pressure type head slider to/from the disk; and a ramp member fixed to the base for supporting the negative pressure type head slider unloaded from the disk; the actuator comprising an actuator arm rotatably mounted on the base; a suspension fixed at a base end portion thereof to a front end portion of the actuator arm; and the negative pressure type head slider mounted on a front end portion of the suspension; the negative pressure type head slider comprising a front rail formed on the disk opposing surface in the vicinity of the air inlet end, the front rail having a air bearing surface and a step surface lower in level than the air bearing surface; a transducer formed in the vicinity of the air outlet end; a first groove for expanding air once compressed by the front rail to generate a negative pressure; and a second groove formed on the step surface near the air inlet end except opposite side portions of the step surface; the step surface reaching the air inlet end at the opposite side portions.

The second groove may be replaced by a pair of second grooves formed on the step surface near the air inlet end except a laterally central portion of the step surface. In this case, the step surface reaches the air inlet end at the laterally central portion.

In each configuration mentioned above, the step surface reaches the air inlet end. Accordingly, even if the head slider comes into contact with a disk medium upon loading, the relatively broad end of the step surface formed by photolithography rather than a sharp edge of the step surface formed by cutting comes into contact with the disk medium, thereby exhibiting an additional effect that the damage to the disk medium due to the contact of the head slider and the disk medium upon loading can be reduced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
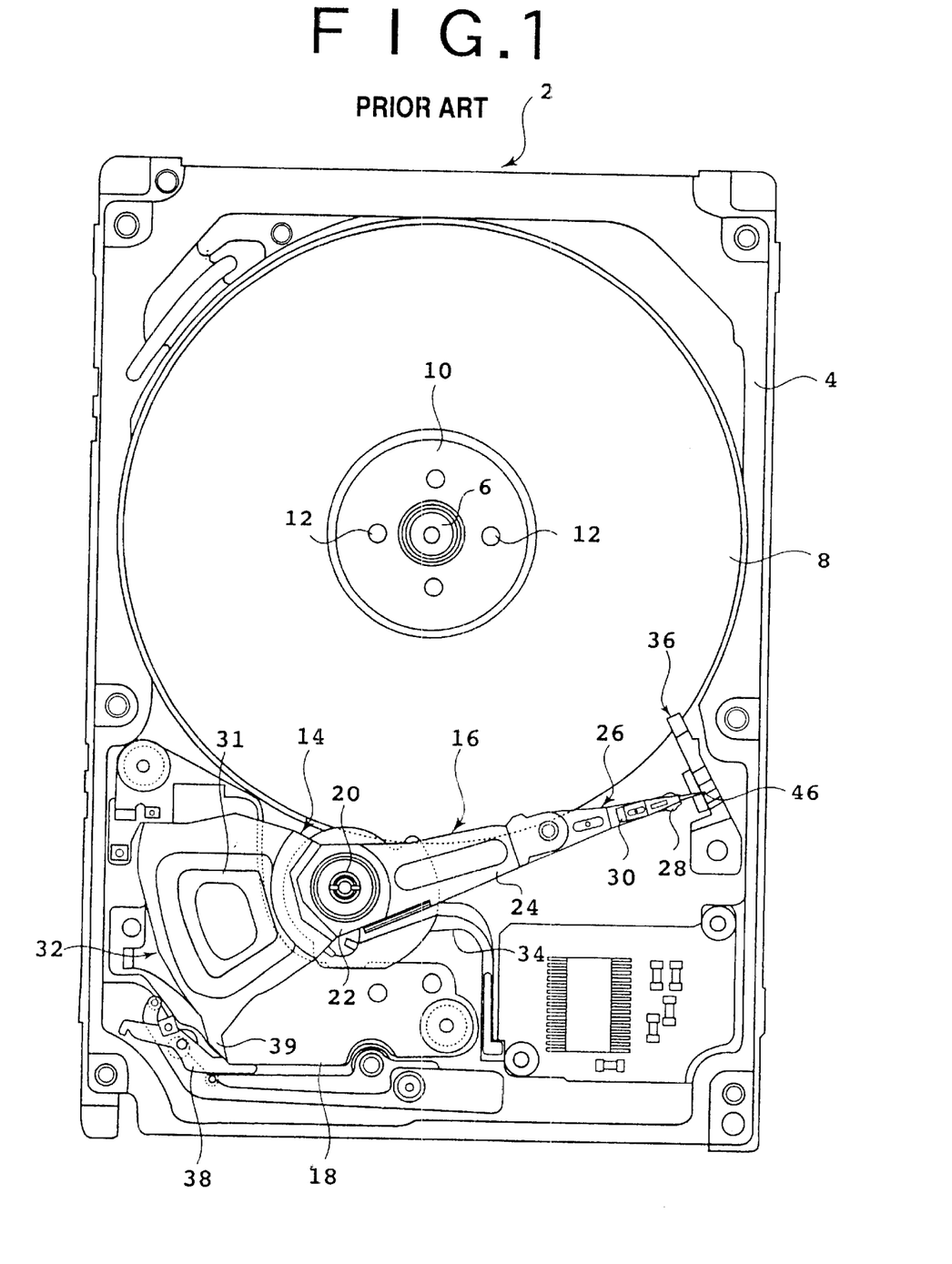
FIG. 1 is a plan view of a magnetic disk drive with a cover removed.

Referring to FIG. 1, there is shown a plan view of a magnetic disk drive according to a first preferred embodiment of the present invention in the condition where a cover is removed. Reference numeral 2 denotes a housing consisting of a base 4 and the cover (not shown) fixed to the base 4. A shaft 6 is fixed to the base 4, and a spindle hub (not shown) is rotatably mounted on the shaft 6. The spindle hub is driven by a DC motor (not shown) to rotate about the shaft 6. A plurality of magnetic disks 8 and spacers (not shown) are mounted on the spindle hub so as to be alternately stacked. That is, the plural magnetic disks 8 are fixedly mounted on the spindle hub by securing a disk clamp 10 to the spindle hub by means of a plurality of screws 12, and are equally spaced a given distance by the spacers.

Reference numeral 14 denotes a rotary actuator consisting of an actuator arm assembly 16 and a magnetic circuit 18. The actuator arm assembly 16 is rotatable about a shaft 20 fixed to the base 4. The actuator arm assembly 16 includes an actuator block 22 rotatably mounted on the shaft 20 through a pair of bearings (not shown), a plurality of actuator arms 24 extending horizontally from the actuator block 22 in one direction, and a head assembly 26 fixed to a front end portion of each actuator arm 24. Each head assembly 26 includes a negative pressure type head slider 28 having a magnetic head element (transducer) for reading/writing data from/to the corresponding magnetic disk 8, and a suspension (load beam) 30 having a front end portion supporting the head slider 28 and a base end portion fixed to the corresponding actuator arm 24.

A coil 31 is supported on the opposite side of the actuator arms 24 with respect to the shaft 20. The coil 31 is inserted in a gap of the magnetic circuit 18. The magnetic circuit 18 and the coil 31 constitute a voice coil motor (VCM) 32. Reference numeral 34 denotes a flexible printed circuit board (FPC) for supplying a write signal to the magnetic head element and for taking a read signal from the magnetic head element. One end of the flexible printed circuit board 34 is fixed to a side surface of the actuator block 22.

Figure 2A:
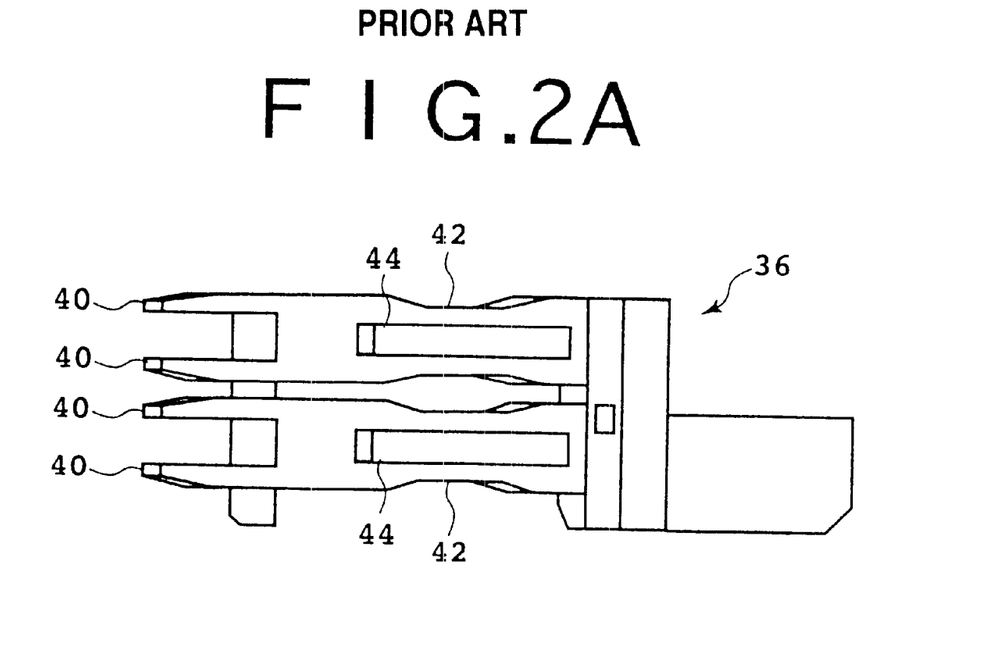
FIG. 2A is a side view of a ramp member.
Figure 2B:
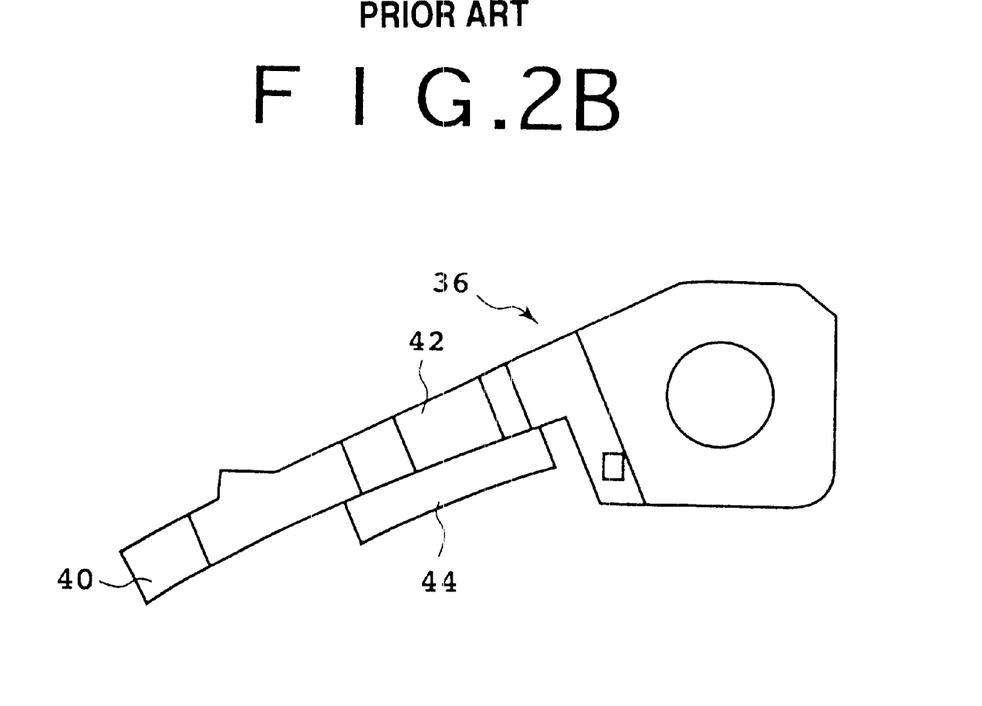
FIG. 2B is a plan view of the ramp member.

A ramp member 36 is fixed to the base 4 at a position adjacent to the outer circumferences of the magnetic disks 8. As shown in FIGS. 2A and 2B, the ramp member 36 has a plurality of ramps (inclined portions) 40 whose number corresponds to the number of the head sliders 28, and a plurality of parking portions 42 each for allowing a horn portion 46 formed at the front end of each head assembly 26 to be stably parked thereon. Further, a plurality of side projections 44 for preventing the unloaded head sliders 28 from interfering with each other are formed on a side surface of the ramp member 36. Reference numeral 38 in FIG. 1 denotes a latch mechanism for latching a projecting portion 39 of the actuator 14 in its unloaded condition.

The condition shown in FIG. 1 is an unloaded condition where the head sliders 28 have been unloaded from the magnetic disks 8. In this condition, the horn portions 46 of the head assemblies 26 are parked on the parking portions 42 of the ramp member 36, and the projecting portion 39 of the actuator 14 is latched by the latch mechanism 38. When a computer connected to this magnetic disk drive is powered on or a sleep mode is canceled in this unloaded condition, the magnetic disks 8 first start to be rotated. Thereafter, the latch mechanism 38 is released to rotate the actuator 14 counterclockwise as viewed in FIG. 1, so that the horn portions 46 slide down on the ramps 40 and the head sliders 28 are loaded to the magnetic disks 8.

When the computer is powered off or put into the sleep mode, control means such as an MPU mounted on a main printed circuit board (not shown) in the magnetic disk drive controls the actuator 14 so that the actuator 14 is rotated clockwise as viewed in FIG. 1 to move the head sliders 28 from the loaded condition through the outer circumferences of the magnetic disks 8 to the ramp member 36. Accordingly, the horn portions 46 of the head assemblies 26 slide up on the ramps 40 of the ramp member 36 and are then parked on the parking portions 42 of the ramp member 36. In this unloaded condition, the projecting portion 39 of the actuator 14 is latched by the latch mechanism 38.

Figure 3:
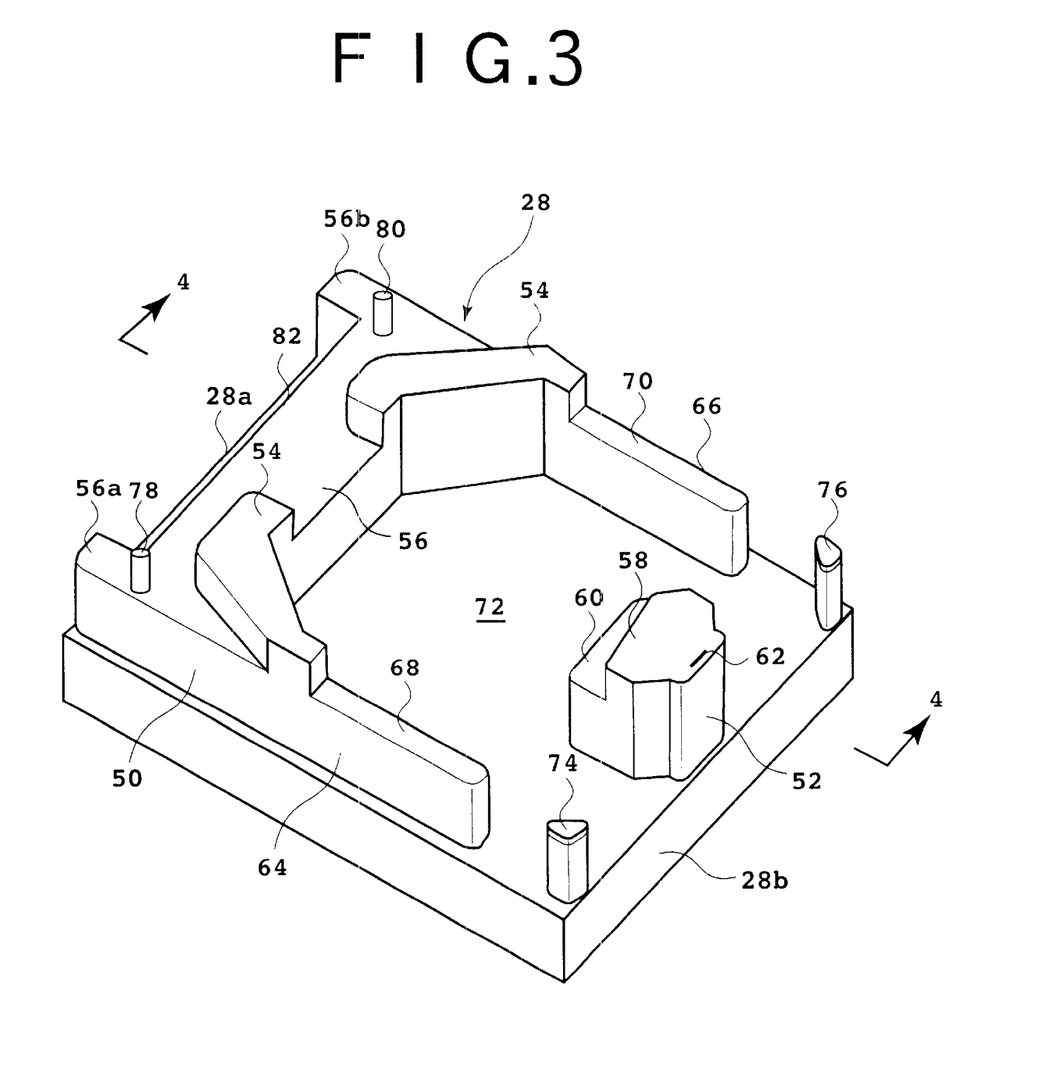
FIG. 3 is a perspective view of a magnetic head slider according to a first preferred embodiment of the present invention.
Figure 4:
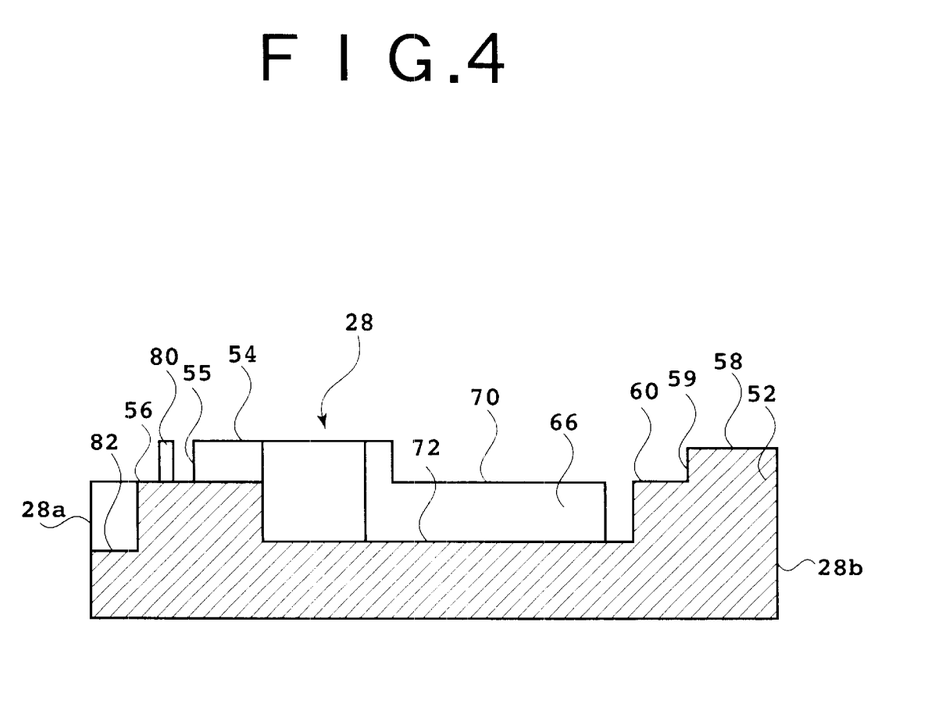
FIG. 4 is a cross section taken along the line 4—4 in FIG. 3.

Referring to FIG. 3, there is shown a perspective view of the negative pressure type magnetic head slider 28 according to the first preferred embodiment of the present invention. FIG. 4 is a cross section taken along the line 4—4 in FIG. 3. The magnetic head slider 28 is in the form of a rectangular parallelepiped, and has an air inlet end 28a and an air outlet end 28b. The size of the magnetic head slider 28 is 1.25 mm long, 1 mm wide, and 0.3 mm thick, for example. The magnetic head slider 28 is formed of $Al_2O_3$—TiC, and it is produced by forming a plurality of electromagnetic conversion elements (electromagnetic transducers) on a wafer, next cutting the wafer into a plurality of bars, and processing a side surface of each bar to form a rail surface (disk opposing surface). The formation of the rail surface is performed by using photolithography.

The magnetic head slider 28 is of a negative pressure type, and it has a front rail 50 formed near the air inlet end 28a and a rear center rail 52 formed near the air outlet end 28b. The front rail 50 is formed with an air bearing surface 54 and a step surface 56 lower in level than the air bearing surface 54 by a given difference 55 as shown in FIG. 4. Similarly, the rear center rail 52 is formed with an air bearing surface 58 and a step surface 60 lower in level than the air bearing surface 58 by a given difference 59 as shown in FIG. 4. An electromagnetic conversion element (transducer) 62 is formed on the air bearing surface 58 at a position near the air outlet end 28b.

A pair of side rails 64 and 66 extend downstream from the opposite side portions of the front rail 50 toward the air outlet end 28b. The side rails 64 and 66 have upper surfaces 68 and 70, respectively. Each of the upper surfaces 68 and 70 of the side rails 64 and 66 has the same level as that of the step surface 56 of the front rail 50. A groove 72 is formed on the upper surface (disk opposing surface) of the head slider 28 at a position just downstream of the front rail 50 so as to be surrounded by the front rail 50 and the side rails 64 and 66. The depth of the groove 72 from the air bearing surface 54 is about 1.4 $\mu$m, and the difference 55 between the air bearing surface 54 and the step surface 56 is about 0.2 $\mu$m. Similarly, the difference 59 between the air bearing surface 58 and the step surface 60 is about 0.2 $\mu$m.

A pair of collision prevention pads 74 and 76 are formed on the upper surface of the magnetic head slider 28 at its two corners near the air outlet end 28b. The height of each of the collision prevention pads 74 and 76 is the same as that of each of the step surfaces 56 and 60. The collision prevention pads 74 and 76 function to prevent that the two corners of the magnetic head slider 28 near the air outlet end 28b may collide with the disk facing the head slider 28. A pair of stiction prevention pads 78 and 80 are formed on the step surface 56 of the front rail 50. The height of each of the stiction prevention pads 78 and 80 from the air bearing surface 54 is about 30 nm.

A groove 82 is formed on the step surface 56 near the air inlet end 28a except opposite side portions 56a and 56b of the step surface 56. That is, the step surface 56 reaches the air inlet end 28a at the opposite side portions 56a and 56b. The depth of the groove 82 is similar to that of the groove 72. The width of each of the opposite side portions 56a and 56b is less than or equal to 200 μm, preferably in the range of 50 to 150 μm. Further, the length of the groove 82 in the longitudinal direction of the head slider 28 is in the range of 10 to 80 μm, preferably 40 to 60 μm.

When the magnetic disk is rotated to generate an air flow along the disk surface, the air flow collides with the difference 55 between the air bearing surface 54 and the step surface 56 and the difference 59 between the air bearing surface 58 and the step surface 60, and thereafter acts on the air bearing surfaces 54 and 58. As a result, flying forces for flying the head slider 28 above the disk surface are generated on the air bearing surfaces 54 and 58. While such flying forces are generated also on the step surfaces 56 and 60, these flying forces are not so large.

In the head slider 28, the area of the air bearing surface 54 is relatively large, so that a relatively large flying force is generated on the air bearing surface 54 during rotation of the magnetic disk. As a result, the head slider 28 is maintained in an inclined attitude at a pitch angle α such that the air inlet end 28a is tilted up. The pitch angle α is an angle of inclination of the head slider 28 along the flow direction of the air flow. The groove 72 is formed just downstream of the front rail 50. Accordingly, when passing the air bearing surface 54 of the front rail 50, the air flow is expanded in the groove 72 in a direction perpendicular to the disk surface, thereby generating a negative pressure in the groove 72. This negative pressure comes into balance with the above-mentioned flying forces applied to the air bearing surfaces 54 and 58, thereby defining a flying height of the head slider 28.

Furthermore, the groove 82 is formed on the step surface 56 of the front rail 50 at a portion near the air inlet end 28a except the opposite side portions 56a and 56b. Accordingly, the positive pressure (flying force) generated by the combination of the groove 82 and the step surface 56 can be suppressed. As a result, an increase in pitch angle at high peripheral speeds can be suppressed. If the width of each of the opposite side portions 56a and 56b of the step surface 56 (i.e., the width of a portion of the step surface 56 reaching the air inlet end 28a) is too large, a collision prevention margin upon loading the head slider 28 is reduced. Accordingly, the width of each of the opposite side portions 56a and 56b is set preferably less than or equal to 200 μm, more preferably in the range of 50 to 150 μm.

Figure 5:
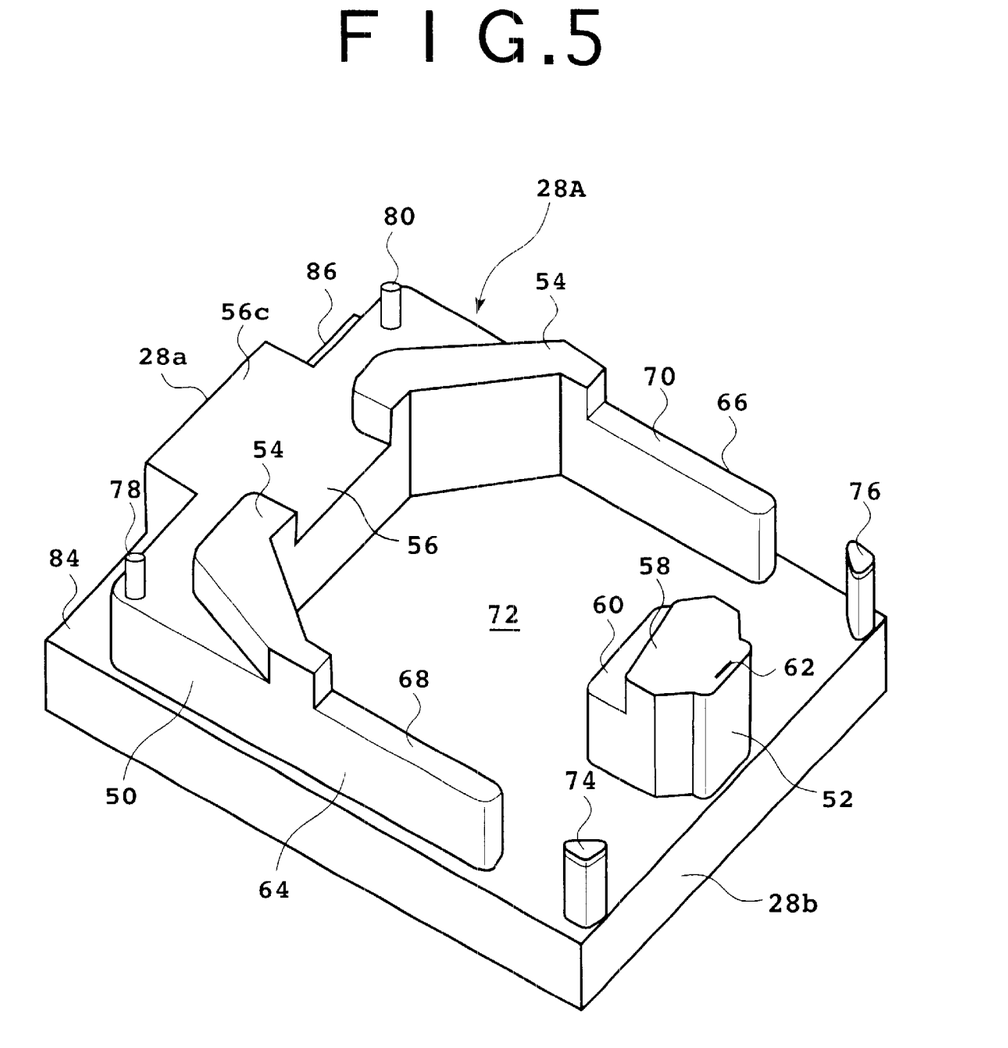
FIG. 5 is a perspective view of a magnetic head slider according to a second preferred embodiment of the present invention.

Referring to FIG. 5, there is shown a perspective view of a magnetic head slider 28A according to a second preferred embodiment of the present invention. Substantially the same parts as those of the magnetic head slider 28 according to the first preferred embodiment mentioned above are denoted by the same reference numerals. In the magnetic head slider 28A, a pair of grooves 84 and 86 are formed on the step surface 56 of the front rail 50 near the air inlet end 28a except a laterally central portion 56c. That is, the step surface 56 reaches the air inlet end 28a at the laterally central portion 56c only.

Also in the magnetic head slider 28A, a positive pressure generated by the combination of the grooves 84 and 86 and the step surface 56 can be suppressed by the formation of the laterally central portion 56c, so that an increase in pitch angle at high peripheral speeds can be suppressed. If the width of the laterally central portion 56c of the step surface 56 (i.e., the width of a portion of the step surface 56 reaching the air inlet end 28a) is too large, a collision prevention margin upon loading the head slider 28A is reduced. Accordingly, the width of the laterally central portion 56c is set preferably less than or equal to 700 μm, more preferably in the range of 500 to 700 μm.

Figure 6:
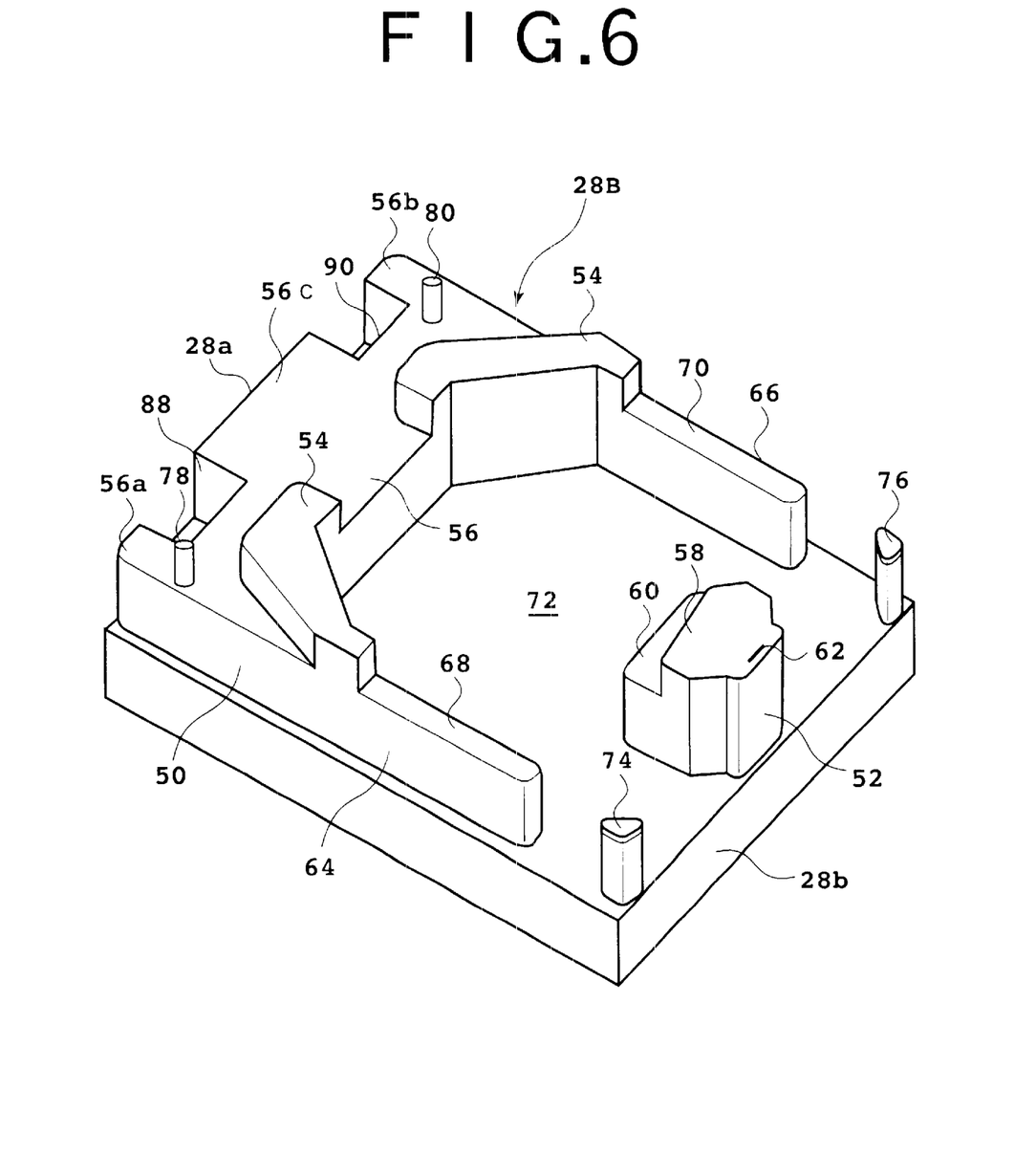
FIG. 6 is a perspective view of a magnetic head slider according to a third preferred embodiment of the present invention.

Referring to FIG. 6, there is shown a perspective view of a magnetic head slider 28B according to a third preferred embodiment of the present invention. The magnetic head slider 28B is configured by combining the structures of the first and second preferred embodiments. That is, the step surface 56 reaches the air inlet end 28a both at the opposite side portions 56a and 56b and at the laterally central portion 56c. With this structure, a groove 88 is formed between the side portion 56a and the laterally central portion 56c, and a groove 90 is formed between the side portion 56b and the laterally central portion 56c. The width of the laterally central portion 56c is less than or equal to 700 μm, preferably in the range of 500 to 600 μm, and the width of each of the opposite side portions 56a and 56b is less than or equal to 200 μm, preferably in the range of 50 to 150 μm.

Figure 7:
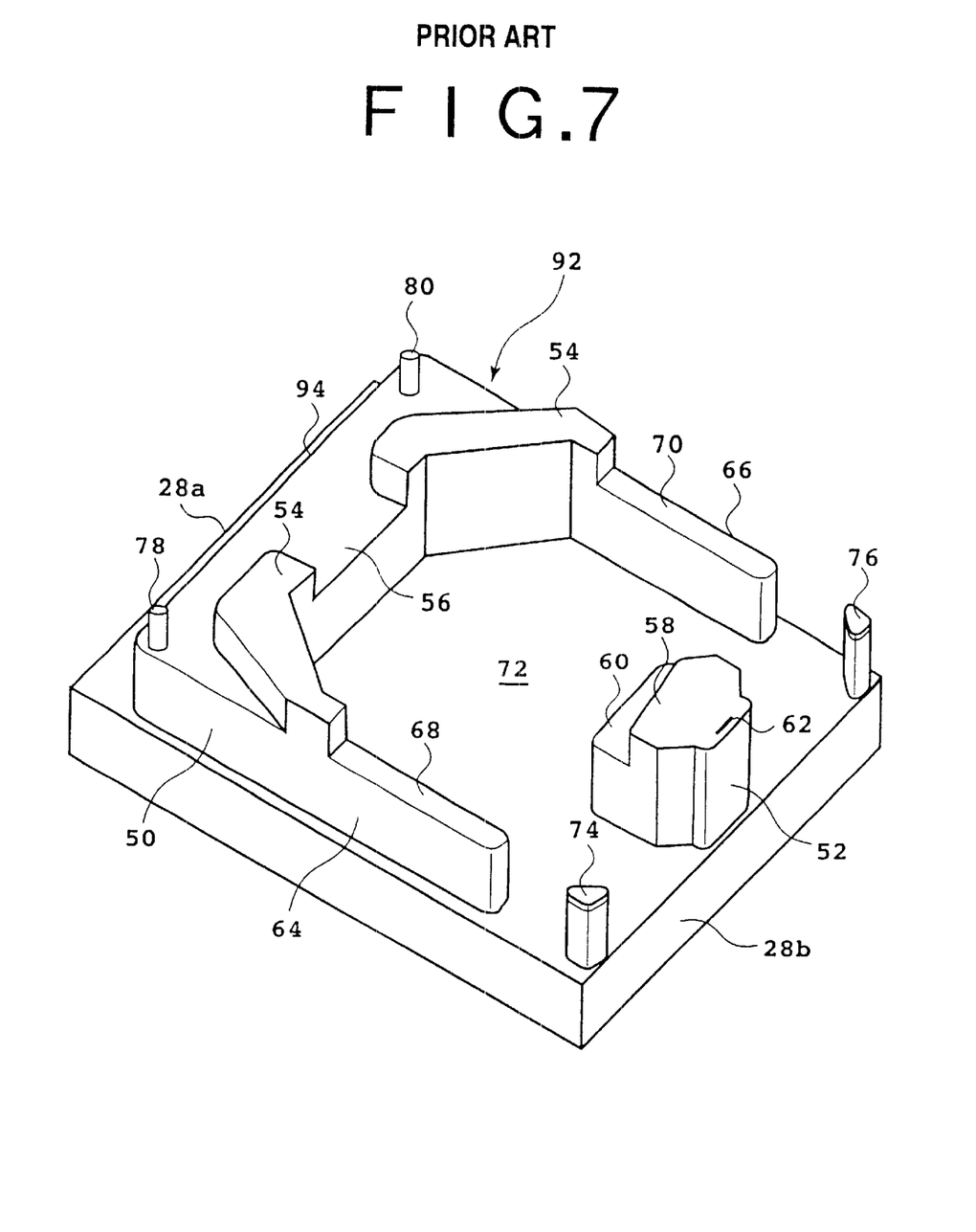
FIG. 7 is a perspective view of a magnetic head slider as a comparison.

Referring to FIG. 7, there is shown a perspective view of a magnetic head slider 92 as a comparison. In the magnetic head slider 92, a groove 94 is formed on the step surface 56 of the front rail 50 near the air inlet end 28a so as to laterally extend over the width of the head slider 92. Accordingly, a large positive pressure can be generated by the combination of the groove 94 and the step surface 56.

Figure 8:
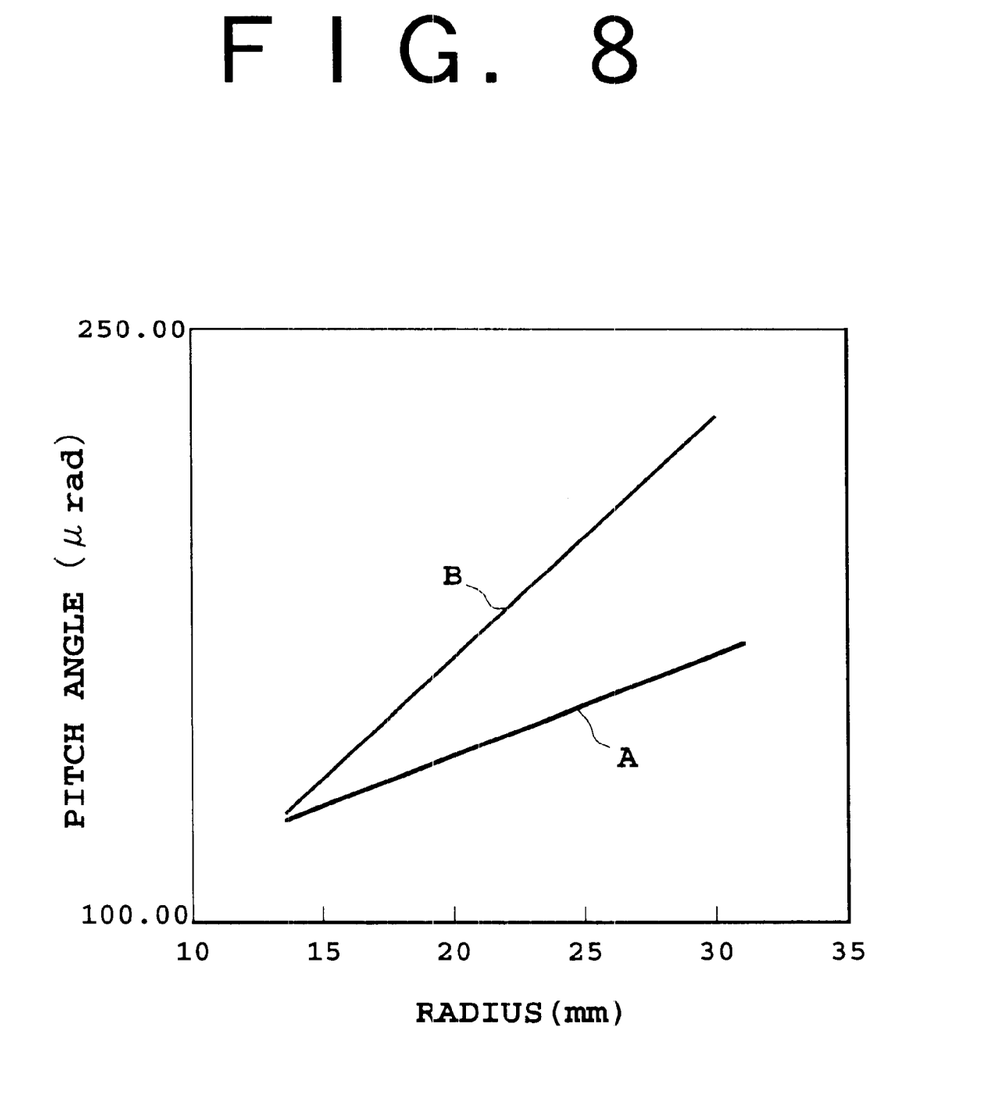
FIG. 8 is a graph showing changes in pitch angle from the inner zone to the outer zone of a disk.

FIG. 8 is a graph showing a peripheral speed dependence of pitch angle. In FIG. 8, the horizontal axis represents the radius of the magnetic disk (the radial distance from the inner zone to the outer zone of the magnetic disk), and the vertical axis represents the pitch angle. In FIG. 8, symbol A corresponds to the magnetic head slider 28 of the first preferred embodiment, and symbol B corresponds to the magnetic head slider 92 of the comparison. As apparent from FIG. 8, an increase in pitch angle at the outer zone relative to at the inner zone is 40 μrad in the first preferred embodiment, whereas it is 110 μrad in the comparison. This result shows that the collision of the air inlet end 28a with the disk upon loading the head slider 28 in the first preferred embodiment can be prevented and that an increased change in flying attitude of the head slider 28 can be suppressed.

Figure 9:
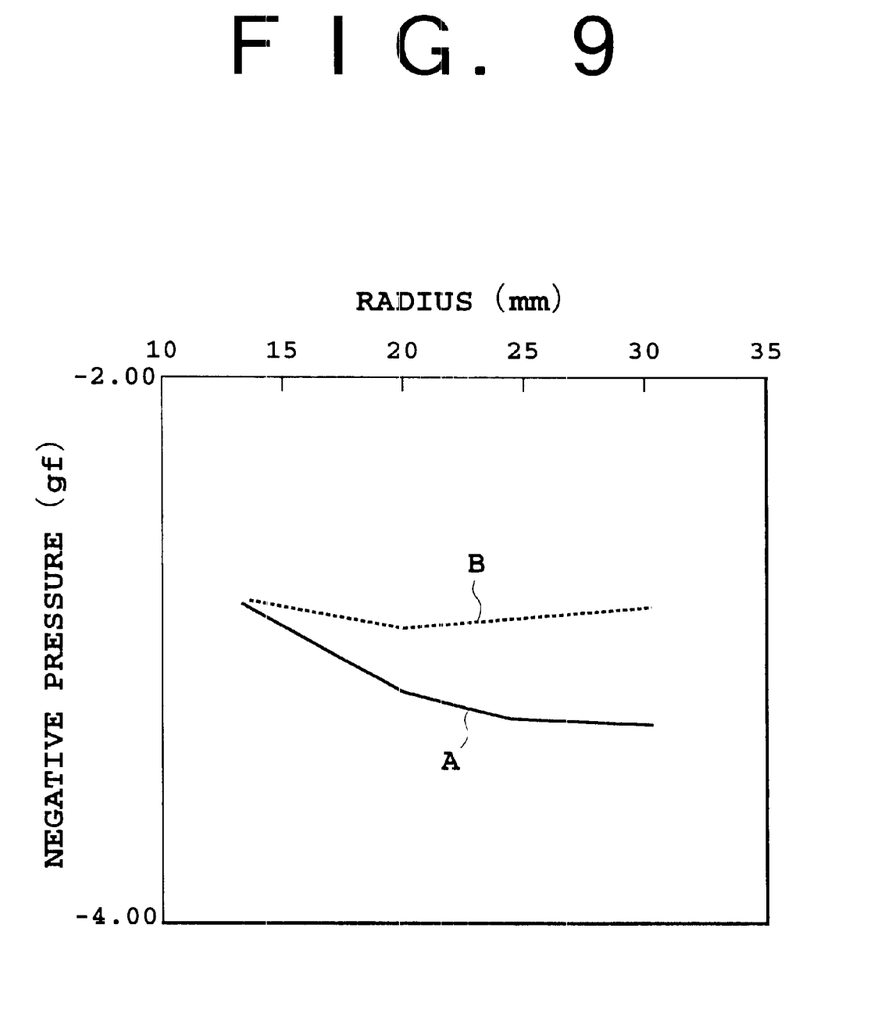
FIG. 9 is a graph showing changes in negative pressure from the inner zone to the outer zone of a disk.

FIG. 9 is a graph showing a peripheral speed dependence of negative pressure. In FIG. 9, symbol A corresponds to the magnetic head slider 28 of the first preferred embodiment, and symbol B corresponds to the magnetic head slider 92 of the comparison. As apparent from FIG. 9, an increase in negative pressure at the outer zone relative to at the inner zone is 0.44 gf in the first preferred embodiment, whereas it is 0.04 gf in the comparison. This result shows that a larger negative pressure can be generated at the outer zone of the disk in the first preferred embodiment.

Table 1 shows variations in parameters indicating the flying attitude of the head slider at the outer zone in the first preferred embodiment and the comparison, where the value of each parameter is 1 in the first preferred embodiment and the values in the comparison are relative values.

TABLE 1

|  | crown | camber | pitch | roll |
|---|---|---|---|---|
| First Preferred Embodiment | 1 | 1 | 1 | 1 |
| Comparison | 1.14 | 2.35 | 1.25 | 1.11 |

As apparent from Table 1, variations in all the parameters at the outer zone in the first preferred embodiment are improved over those in the comparison.

According to the present invention as described above, it is possible to provide a head slider which can avoid the collision with a disk upon loading and can suppress an increase in pitch angle at the outer zone of the disk.

What is claimed is:

1. A head slider having a disk opposing surface, an air inlet end, and an air outlet end, said head slider comprising:

a front rail formed on said disk opposing surface in the vicinity of said air inlet end, said front rail having a first air bearing surface and a first step surface lower in level than said first air bearing surface;

a transducer formed in the vicinity of said air outlet end;

a first groove for expanding air once compressed by said front rail to generate a negative pressure; and a pair of second grooves formed on said first step surface near said air inlet end except a laterally central portion of said first step surface;

said first step surface reaching said air inlet end at said laterally central portion;

wherein said first step surface reaches said air inlet end also at opposite side portions of said first step surface.

2. A head slider according to claim 1, wherein said laterally central portion has a width less than or equal to 700 $\mu$m, and each of said opposite side portions has a width less than or equal to 200 $\mu$m.

* * * * *

UNITED STATES PATENT AND TRADEMARK OFFICE
CERTIFICATE OF CORRECTION

PATENT NO. : 6,683,755 B2
DATED : January 27, 2004
INVENTOR(S) : Ryosuke Koishi It is certified that error appears in the above-identified patent and that said Letters Patent is hereby corrected as shown below:

<u>Column 10,</u>
Line 5, after "and" begin a new paragraph - therefore.

Signed and Sealed this

First Day of June, 2004

JON W. DUDAS
*Acting Director of the United States Patent and Trademark Office*